(12) United States Patent
Liu et al.

(10) Patent No.: US 9,622,212 B2
(45) Date of Patent: Apr. 11, 2017

(54) PAGING METHOD AND DEVICE

(71) Applicant: ZTE CORPORATION, Shenzhen, Guangdong (CN)

(72) Inventors: Jingxiang Liu, Shenzhen (CN); Jinguo Zhu, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 14/379,438

(22) PCT Filed: Mar. 15, 2013

(86) PCT No.: PCT/CN2013/072677
§ 371 (c)(1),
(2) Date: Aug. 18, 2014

(87) PCT Pub. No.: WO2013/139235
PCT Pub. Date: Sep. 26, 2013

(65) Prior Publication Data
US 2015/0005019 A1    Jan. 1, 2015

(30) Foreign Application Priority Data

Mar. 21, 2012  (CN) .......................... 2012 1 0076530

(51) Int. Cl.
*H04W 68/00*    (2009.01)
*H04W 68/02*    (2009.01)
(Continued)

(52) U.S. Cl.
CPC ............ *H04W 68/02* (2013.01); *G06F 21/41* (2013.01); *H04W 4/02* (2013.01); *G06F 2221/2111* (2013.01); *H04W 8/02* (2013.01)

(58) Field of Classification Search
CPC ................................................ H04W 36/0022
See application file for complete search history.

(56) References Cited

U.S. PATENT DOCUMENTS 8,718,653 B2    5/2014   Hu et al.
2003/0027572 A1*  2/2003   Karlsson ............... H04W 68/00
                                                   455/433
(Continued)

FOREIGN PATENT DOCUMENTS

CN    101577962    11/2009
CN    101969634    2/2011
(Continued)

OTHER PUBLICATIONS

International Search Report for PCT/CN2013/072677, English translation attached to original, Both completed by the Chinese Patent Office on May 20, 2013, All together 10 Pages.
(Continued)

*Primary Examiner* — Sam K Ahn
*Assistant Examiner* — Fabricio R Murillo Garcia
(74) *Attorney, Agent, or Firm* — Brooks Kushman P.C.

(57) ABSTRACT

A paging method includes, when needing to page a user equipment (UE) according to service requirements, a mobile switching center (MSC) analyzing a user identification if finding that subscriber data are lost at present, judging whether the UE has a possibility of residing in a long term evolution (LTE) network, if yes, finding out one or more mobility management entities (MMEs) which are overlapped with the coverage area of the MSC itself, and sending a paging message for the UE to the MMEs. An MSC includes a first module, a second module, a third module and a fourth module. With the paging method and apparatus provided, the UE in the LTE can be successfully paged under the condition that a visitor location register (VLR) loses the subscriber data and a home location register (HLR) fails to return an MME identification.

8 Claims, 7 Drawing Sheets

(51) Int. Cl.
*H04W 4/02* (2009.01)
*G06F 21/41* (2013.01)
*H04W 8/02* (2009.01)

(56) References Cited

U.S. PATENT DOCUMENTS

| | | | |
|---|---|---|---|
| 2009/0036131 | A1 | 2/2009 | Diachina et al. |
| 2010/0167756 | A1* | 7/2010 | Park ............ H04W 64/00 455/456.1 |
| 2010/0323695 | A1 | 12/2010 | Kallio et al. |
| 2010/0331023 | A1 | 12/2010 | Cai et al. |
| 2011/0269457 | A1* | 11/2011 | Liu ............. H04W 8/06 455/433 |
| 2011/0294526 | A1* | 12/2011 | Gafrick .......... H04W 4/14 455/466 |
| 2012/0044910 | A1* | 2/2012 | Maeda ............ H04L 5/0005 370/332 |
| 2012/0257600 | A1* | 10/2012 | Diachina ........ H04W 36/0022 370/332 |
| 2012/0282941 | A1 | 11/2012 | Lu et al. |
| 2012/0302234 | A1* | 11/2012 | Wallis .......... H04W 36/0022 455/433 |
| 2013/0237213 | A1* | 9/2013 | Tian ........... H04W 36/0022 455/432.1 |
| 2014/0177599 | A1 | 6/2014 | Tao |

FOREIGN PATENT DOCUMENTS

| | | |
|---|---|---|
| CN | 102045791 | 5/2011 |
| CN | 102186158 | 9/2011 |
| CN | 102612015 | 7/2012 |
| EP | 2317790 | 5/2011 |
| WO | 2012045486 | 4/2012 |

OTHER PUBLICATIONS

Huawei., 3GPP TSG CT WG1 Meeting # 57, San Antonio (TX), USA, Feb. 9-19, 2009, 3 Pages, "Discussion the paging procedure in CSFB when MME restarts." .

Extended European Search Report for European Application No. 13764625.3, Completed by the European Patent Office, Dated Oct. 29, 2015, 9 Pages.

3GPP TR 23.857, V1.7.0, XP 050555243, Feb. 20, 2012, Release 11, 60 Pages, "3rd Generation Partnership project; Technical Specification Group Core Network and Terminals; Study of EPC Nodes Restoration".

3GPP TS 23.007 V11.1.0, XP 050580528, Mar. 8, 2012, Release 11, 57 Pages, "3rd Generation Partnership Project; Technical Specification Group Core Network and Terminals; Restoration procedures".

\* cited by examiner

PAGING METHOD AND DEVICE

CROSS-REFERENCE TO RELATED APPLICATION

This application is the U.S. national phase of PCT Appln. No. PCT/CN2013/072677 filed Mar. 15, 2013 which claims priority to Chinese Application No. 201210076530.5 filed Mar. 21, 2012, the disclosures of which are incorporated in their entirety by reference herein.

TECHNICAL FIELD

The present document relates to a system and method for a terminal falling back in the communication field, and in particular, to a paging method and apparatus for falling back from a system architecture evolution (SAE) network to a circuit switched (CS) calling network.

BACKGROUND OF THE RELATED ART

The system architecture evolution (SAE) network is a new generation of the wireless network technology which is established by the 3rd Generation Partnership Project (3GPP) organization and used for replacing the traditional circuit exchanging network, and it includes the Long Term Evolution (LTE) network and the Evolved Packet Core (EPC) network. The framework is shown in FIG. 1, and the function of each network element is described as follows.

The User Equipment (abbreviated as UE) has the ability of accessing two kinds of wireless networks, i.e. the Universal Terrestrial Radio Access Network/Global system for Mobile Communications (GSM) Enhanced Data rates for GSM Evolution (EDGE) Radio Access Network (UTRAN/GERAN) (referring to the General Packet Radio Service (GPRS) radio network, wherein, the UTRAN represents the 3G network, and the GERAN represents the 2G network) and the LTE wireless network. The UE can only reside in one wireless system at one moment (called single radio) because of the ability limitation and the energy conservation requirement, for example, when the UE resides in the LTE, it is unable to receive the paging message from the UTRAN/GERAN at this moment.

The evolved NodeB (abbreviated as eNodeB) can provide higher uplink and downlink speed, lower transmission delay and more reliable wireless transmission than the UTRAN on the air interface. The eNodeB provides the wireless resources for the terminal access, and at the same time, establishes the S1 control plane link with the Mobility Management Entity (MME) of the core network.

The Mobility Management Entity (abbreviated as MME) is a control plane entity, is a server for storing the subscriber data temporarily, and is responsible for managing and storing the UE context (such as, the UE/user identification, the mobility management state, and the user security parameter, etc.) and distributing the temporary identification, such as the Globally Unique Temporary Identity (GUTI) for the user, and the MME is responsible for performing the authentication on the user when the user accesses through the LTE network.

The System Architecture Evolution (SAE) Gateway (GW) (abbreviated as SAE GW) is a user plane entity, responsible for the route processing of the user plane data. The SAE GWs are generally divided into serving gateways (Serving GWs) and Packet Data Network (PDN) GWs, the Serving GW is responsible for the mobility anchor point between the LTE and the Universal Mobile Telecommunications System (UMTS), and in an idle state, the downlink data trigger the MME and the Serving GPRS Support Node (SGSN) paging; the PDN GW is responsible for the gateway function that the UE accesses the Packet Data Network (PDN), which assigns the user Internet Protocol (IP) address for the user. The PDN GW and the Serving GW may be set in one physical entity together.

The Home Subscriber Server (HSS) is used for storing the subscription data of the user, and recording the name of the MME to which the user belongs at the same time.

FIG. 1 provides the framework of the traditional circuit domain switching network at the same time. Wherein, the network element of the core network has a Mobile Switching Center (abbreviated as MSC) and the Visitor Location Register (abbreviated as VLR), and the MSC and VLR are generally combined together physically.

The 3G Radio Network Controller (abbreviated as RNC) and/or the Base Station Controller (abbreviated as BSC) are responsible for controlling and managing the wireless activity of the user.

The traditional circuit domain switching network uses the Home Location Register (abbreviated as HLR) to store the subscription information of the user and the address of the VLR. In the calling process of the called, the HLR can obtain the Mobile Station Roaming Number (abbreviated as MSRN) of the user from the VLR. In FIG. 1, the HLR and the HSS are held by one physical network element.

The Gateway Mobile Switching Center (abbreviated as GMSC) is used for routing the call to the MSC to which the user belongs. When there is a call to the mobile user, the GMSC obtains the MSRN of the user through HLR, and then routes the call according to the MSRN.

The MME element of the SAE network and the VLR of the traditional circuit domain switching network are connected through the SGs interface (that is, the interface between the MME and the MSC).

It is a long-term trend that the SAE network replaces the traditional circuit domain switching network. In this process, because the wireless coverage performance of the traditional circuit domain switching network is better, and the service is comparatively steady, it is the effective supplement for the SAE network. When the SAE network is unable to provide the satisfied traditional speech service, then it is to turn to the traditional circuit domain switching network for providing the relative service. This kind of mechanism of returning to the traditional circuit domain switching network is named the Circuit Switch Fallback (abbreviated as CSFB) technology, and the UE that can fall back to the traditional circuit domain switching network to perform the service is called a Dual Mode Single Radio UE. The CSFB technology establishes the SGs interface between the MME of the SAE network and the VLR of the traditional circuit domain switching network. Through that interface, the MME enables the UE roaming in the LTE to trigger the location update procedure in the traditional circuit domain switching network, thus enabling the UE to register with the traditional circuit domain switching network when the UE is active in the SAE network. As shown in FIG. 2, the process includes the following steps.

In step 201, when the UE in the LTE starts up or changes the Tracking Area (abbreviated as TA), it initiates a startup (ATTACH) or Tracking Area Update (abbreviated as TAU) operation to the MME.

In step 202, the MME receives the above-mentioned message, and performs the registration from the SAE network to the HSS.

In step 203, after the registration is successful, the MME derives out the Location Area Identity (abbreviated as LAI) of the UE in the traditional circuit domain switching network according to the tracking area to which the UE belongs, and it is positioned to the corresponding VLR. Through the SGs interface, the MME sends the location update request to the VLR.

In step 204, if the VLR does not have the subscriber data, or the VLR does not think that the subscriber data are reliable, then the VLR sends the location update request to the HLR.

In step 205, the HLR will send the Insert Subscriber Data (ISD) request to the VLR, and the VLR records the subscription data of the user, and returns the response.

In step 206, the HLR returns a location update success response, and records the number of the VLR to which the user belongs.

In step 207, the VLR returns a location update completion message to the MME, and changes the state of the SGs interface as activated.

The user can receive the call of the called from the traditional circuit domain switching network by way of the CSFB after registering with the HLR, and the process refers to FIG. 3, specifically including the following steps.

In step 301, after receiving the Initial Address Message (IAM) of the outer net, the GMSC finds the called HLR according to the called Mobile Station Integrated Services Digital Network (MSISDN) number (that is, the user telephone number), and sends Send Routing Information (SRI) request to the HLR, with the MSISDN number of the user being carried therein.

In step 302, the HLR finds the MSC/VLR registered by the user according to the MSISDN number, and sends the Provide Roaming Number (PRN) request to the MSC/VLR, and the MSC/VLR is the MSC/VLR registered by the UE from the LTE/EPC network at this moment. The MSC/VLR distributes the temporary user identification, that is, the MSRN, and returns it to the HLR. The MSRN identifies the MSC/VLR and the called UE uniquely.

In step 303, the HLR returns an SRI response to the GMSC, carrying the MSRN.

In step 304, then the GMSC routes the call to the MSC/VLR according to the MSRN.

In step 305, the MSC/VLR initiates the CS paging process from the SGs to the MME, then the MME initiates the CS paging process inside the LTE network, and returns the service request to the MSC/VLR.

In step 306, the UE returns to the circuit domain, and initiates the paging response from the traditional circuit domain switching network.

In step 307, if required, the MSC/VLR performs the access operation.

In step 308, the MSC/VLR sends the call setup request Setup to the UE.

In step 309, the MSC/VLR and the UE finish the left called setup process.

In the above-mentioned process, if the MSC/VLR in the traditional circuit domain switching network breaks down and loses the subscriber data, then the subscriber data can be recovered, including the MME name from the HLR, so as to page. As shown in FIG. 4, the process includes the following steps.

In step 401, the HLR sends the PRN request to the MSC/VLR.

In step 402, the MSC/VLR receives the PRN request, and finds that it does not have the subscriber data, so it sends the Recover Subscriber Data (RSD) request to the HLR.

In step 403, the HLR receives the RSD request, sends the ISD request to the MSC/VLR, including the identification of the MME to which the user belongs.

In step 404, the MSC/VLR records the subscriber data, and returns the ISD response to the HLR.

In step 405, the HLR returns the RSD response to the MSC/VLR.

In step 406, the MSC/VLR returns a roaming number to the HLR.

In step 407, the MSC/VLR continues the calling processing, and performs the paging after receiving the initial address message, wherein, the MME is positioned by using the MME identification obtained from the HLR.

But in the practical application, the HLR is likely not to return the MME address, and the most common reason is that some operators are unwilling to update for the HLR, in this way, the VLR cannot obtain the information necessary for paging, and the call will fail.

SUMMARY OF THE INVENTION

The objective of the present document is to provide a paging method and apparatus, to page the terminal in LTE under the condition that the VLR loses the subscriber data and the HLR fails to return the MME identification.

In order to solve the above-mentioned technical problem, the embodiment of the present document provides a paging method, comprising:

when needing to page a user equipment according to service requirements, a mobile switching center analyzing a user identification if finding that subscriber data are lost at present, judging whether the user equipment has a possibility of residing in a long term evolution network, and if yes, finding out one or more mobility management entities which are overlapped with a coverage area of the mobile switching center itself, and sending a paging message for a terminal to the found mobility management entities; and if receiving a location update request or a service request, the mobile switching center performing a paging processing with the mobility management entities sending the location update request or the service request.

The above-mentioned method further has the following characteristics: the step of if receiving a location update request, the mobile switching center performing a paging processing with the mobility management entities sending the location update request comprises:

if receiving the location update request, the mobile switching center sending again the paging message for the terminal to the mobility management entity sending the location update request after processing the location update request.

In order to solve the above-mentioned technical problem, the embodiment of the present document provides a mobile switching center, comprising:

a first module, configured to: when needing to page a user equipment according to service requirements, analyze a user identification if finding that subscriber data are lost at present, and judge whether the user equipment has a possibility of residing in a long term evolution network;

a second module, configured to: find out one or more mobility management entities which are overlapped with a coverage area of the mobile switching center itself when the first module judges that the user equipment has the possibility of residing in the long term evolution network;

a third module, configured to: send a paging message for a terminal to the mobility management entities found by the second module; and a fourth module, configured to: if receiving a location update request or a service request, perform a paging processing with the mobility management entities sending the location update request or the service request.

The above-mentioned mobile switching center further has the following characteristics:

the fourth module is configured to perform a paging processing with the mobility management entities sending the location update request by means of: if receiving the location update request, notifying the third module after processing the location update request; and the third module is further configured to: send again the paging message for the terminal to the mobility management entity sending the location update request after receiving a notification from the fourth module.

In order to solve the above-mentioned technical problem, the embodiment of the present document provides a paging processing method, comprising:

a mobility management entity receiving a paging message for a terminal; and performing a paging processing according to whether there are subscriber data corresponding to the terminal locally.

The above-mentioned method further has the following characteristics: the step of performing a paging processing according to whether there are subscriber data corresponding to the terminal locally comprises:

the mobility management entity judging whether there are the subscriber data corresponding to the terminal locally, if not, then returning a paging refusal message to a mobile switching center; if there are the subscriber data corresponding to the terminal locally, then paging the terminal.

The above-mentioned method further has the following characteristics: after the step of the mobility management entity paging the terminal, the method further comprises:

the mobility management entity judging whether the mobile switching center needs a Temporary Mobile Subscriber Identity, if yes, then returning an interface location update request to the mobile switching center; if the mobile switching center does not need a Temporary Mobile Subscriber Identity, then returning a service request to the mobile switching center.

In order to solve the above-mentioned technical problem, the embodiment of the present document provides a mobility management entity, comprising:

a first module, configured to receive a paging message for a terminal; and a second module, configured to perform a paging processing according to whether there are subscriber data corresponding to the terminal locally.

The above-mentioned method further has the following characteristics: the second module comprises:

a first unit, configured to judge whether there are the subscriber data corresponding to the terminal locally;

a second unit, configured to: when the first unit judges that there are no subscriber data corresponding to the terminal locally, return a paging refusal message to a mobile switching center; and a third unit, configured to: when the first unit judges that there are the subscriber data corresponding to the terminal locally, page the terminal.

The above-mentioned method further has the following characteristics: the second module further comprises:

a fourth unit, configured to: judge whether the mobile switching center needs a Temporary Mobile Subscriber Identity, if yes, then return an interface location update request to the mobile switching center; if the mobile switching center does not need a Temporary Mobile Subscriber Identity, then return a service request to the mobile switching center.

In sum, the embodiment of the present document provides a paging method and apparatus, to page the terminal in the LTE under the condition that the VLR loses the subscriber data and the HLR fails to return the MME identification.

PREFERRED EMBODIMENTS OF THE INVENTION

In order to make the objective, technical scheme and advantage of the present document much more clear and obvious, the embodiments of the present document are described in detail with reference to the accompanying drawings hereinafter. It should be illustrated that, in the case of not conflicting, the embodiments in the present application and features in these embodiments can be combined with each other arbitrarily.

Figure 1:
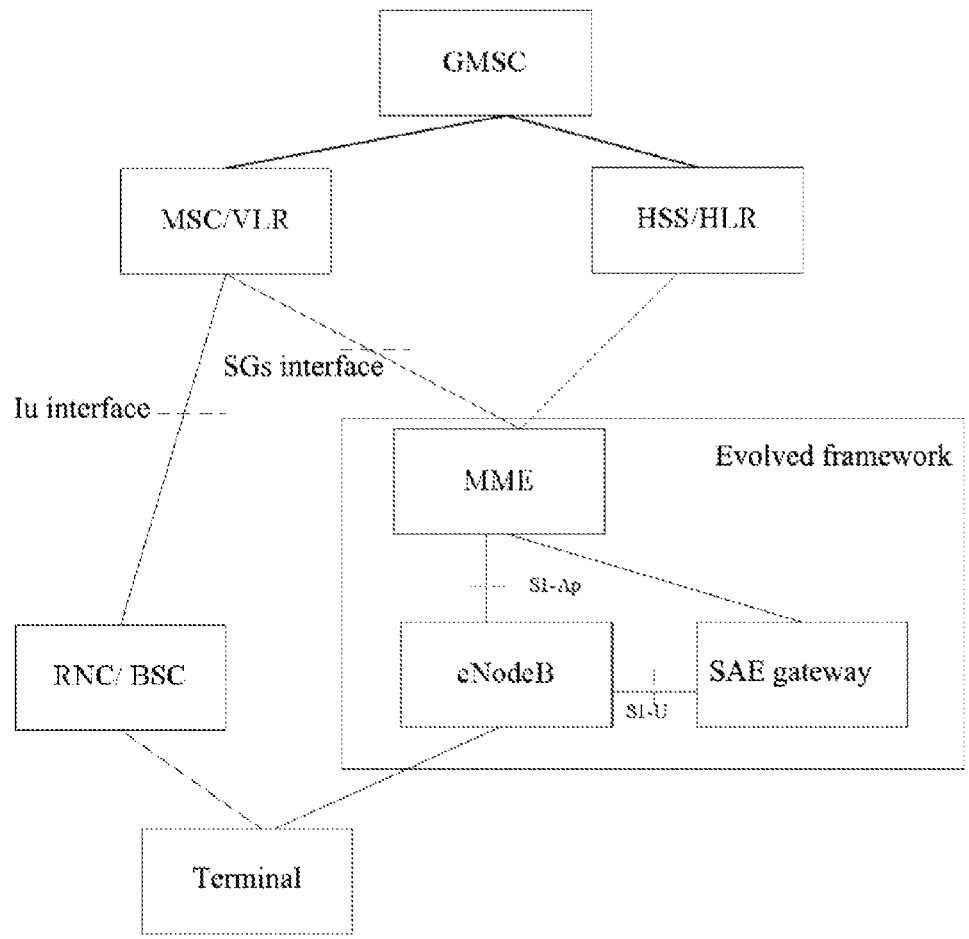
FIG. 1 is a framework diagram of an SAE network and a traditional circuit domain switching network in the related art.
Figure 2:
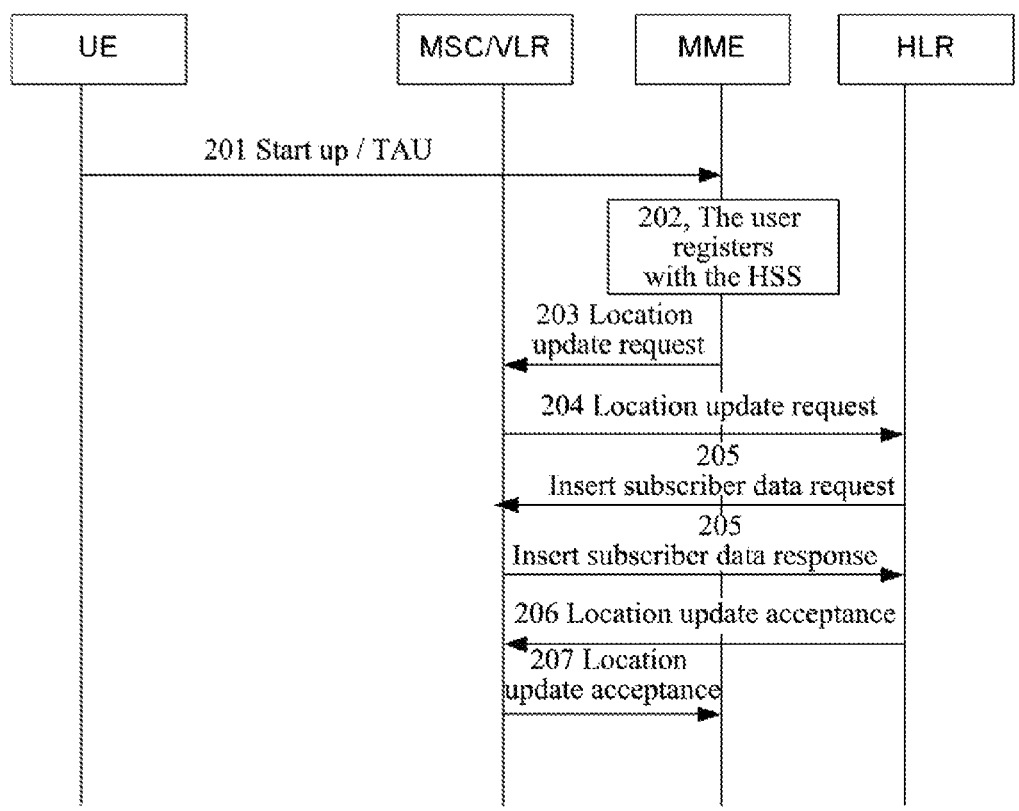
FIG. 2 is a flow chart of a user registering with a traditional circuit domain switching network in LTE in the related art.
Figure 3:
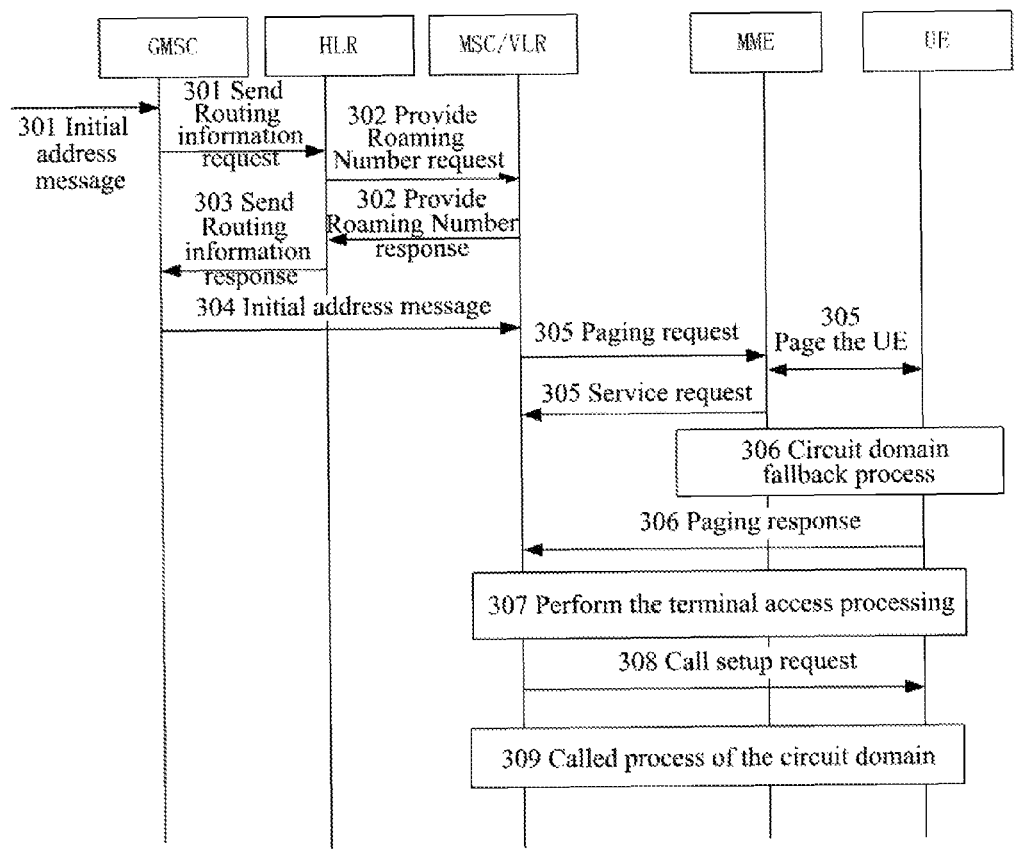
FIG. 3 is a processing flow chart of receiving an incoming call of the traditional circuit domain switching network when the user falls back to the traditional circuit domain switching network in LTE in the related art.
Figures 4, 5:
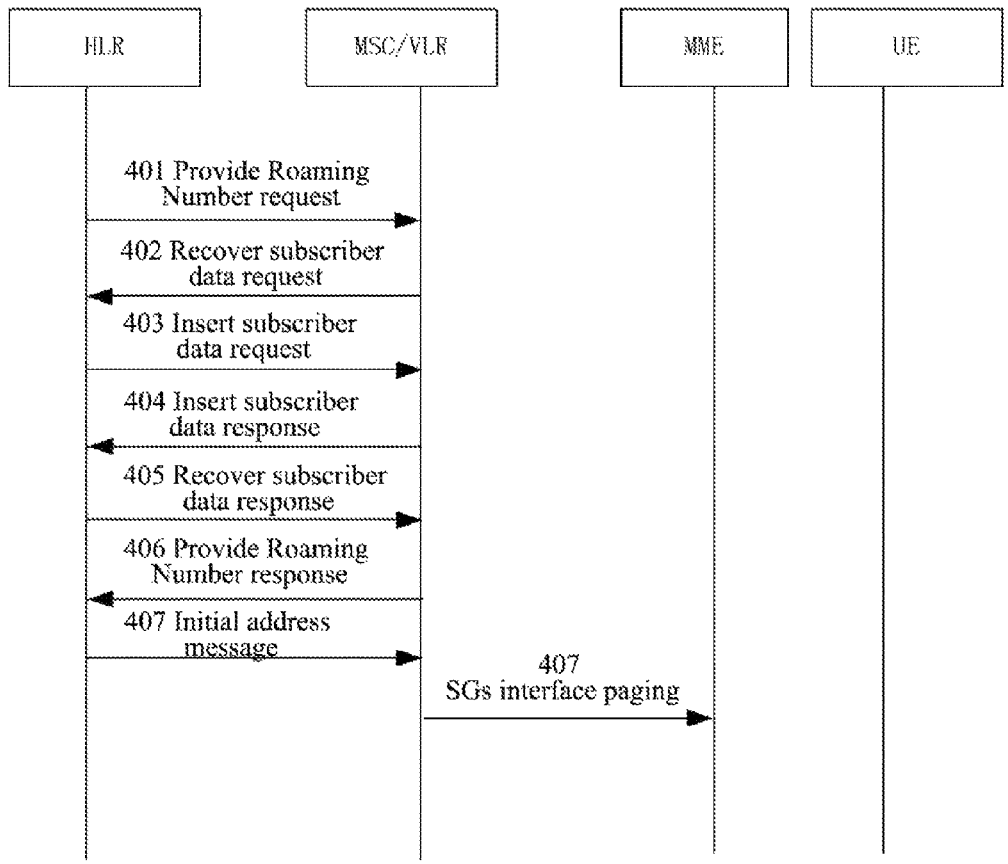
FIG. 4 is a processing flow chart of obtaining an identification of an MME to which the UE belongs from the HLR after the MSC/VLR loses the subscriber data and initiating a paging in the related art.
FIG. 5 is a flow chart of a paging method in an embodiment of the present document.

FIG. 5 is a flow chart of a paging method in an embodiment of the present document. As shown in FIG. 5, the method of the present embodiment includes the following steps:

in step 11, the MSC/VLR needs to page the user equipment (UE) according to the service requirements, while the subscriber data are lost at present, then the MSC/VLR analyzes according to the International Mobile Subscriber Identification Number (IMSI), and finds that the user equipment has a possibility of residing in a long term evolution (LTE) network, then it finds out one or more mobility management entities (MMEs) which are overlapped with a coverage area of itself, and sends a paging message for a terminal to the above-mentioned MMEs.

In step 12, the MME receives the paging message, and performs the paging processing according to whether there are the corresponding subscriber data locally.

After the MME receives the paging message, if there are no data of the UE therein, then it returns the SGs interface service refusal; if there are the data of the UE therein, then it returns the SGs interface location update request or the service request.

In step 13, the MSC/VLR receives the SGs interface location update request or the service request, then it can judge that the UE performs the paging processing with the MME through the connection with the MME under the MME, and performs the subsequent service processing of the UE.

Wherein, if the MME returns the SGs interface location update request, then the MSC/VLR processes the location update request first, and sends the SGs interface paging message to the MME again after processing the location update request.

Wherein, whether the MME returns the SGs interface location update request or the service request is determined according to whether the MSC/VLR needs to use the Temporary Mobile Subscriber Identity (TMSI). If the MSC/VLR needs the TMSI, then the MME returns the SGs interface location update request; if the MSC/VLR does not need the TMSI, then it returns the service request.

Figure 6:
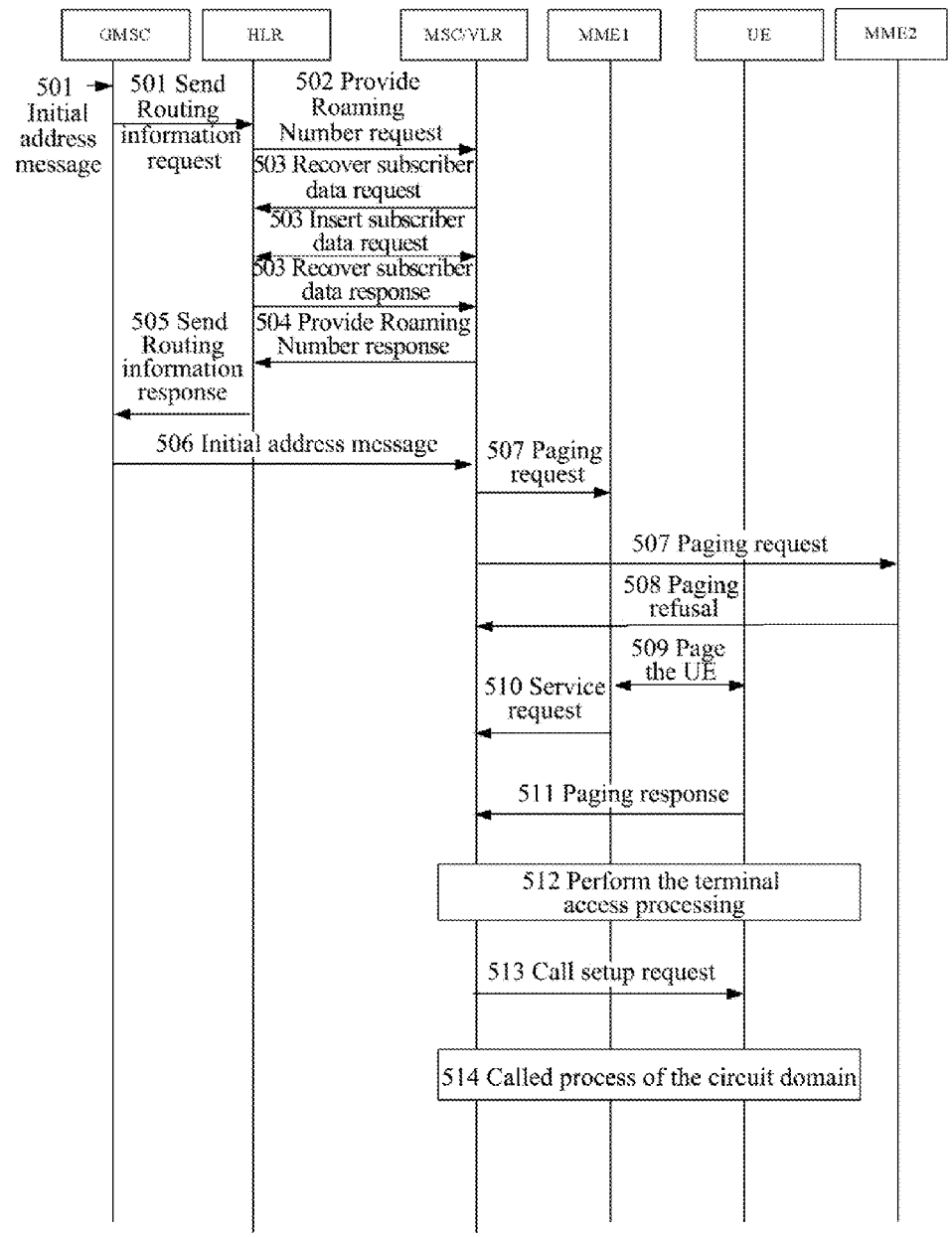
FIG. 6 is a flow chart of a paging method in embodiment one of the present document.

FIG. 6 is a flow chart of the paging method of embodiment one of the present document. In the present embodiment, after the MSC/VLR loses the subscriber data, it sends the paging message to a series of MMEs; wherein, one MME returns the service request; the MSC/VLR confirms that the UE is under the MME, and switches on the processing process of the call, including the following steps specifically.

In step 501, after receiving the Initial Address Message (IAM) of the outer net, the GMSC finds the called HLR according to the called Mobile Station Integrated Services Digital Network (MSISDN) number (that is, the user telephone number), and sends Send Routing Information (SRI) request to the HLR, with the MSISDN number of the user being carried therein.

In step 502, the HLR finds the MSC/VLR registered by the user according to the MSISDN number, and sends the Provide Roaming Number (PRN) request to the MSC/VLR.

In step 503, there are no subscriber data at present in the MSC/VLR, so the subscriber data are recovered from the HLR; in the process, the HLR fails to return the MME identification to the MSC/VLR.

In step 504, after the subscriber data are recovered, the MSC/VLR returns the roaming number to the HLR.

In step 505, the HLR returns the SRI response to the GMSC, which carries the MSRN.

In step 506, then the GMSC will route the call to the MSC/VLR according to the MSRN.

In step 507, the MSC/VLR judges that the subscriber data are lost previously, so the user wireless status information is not reliable, and then it analyzes the user identification, and finds that the user may reside in LTE network, so the MSC/VLR finds out one or more MMEs which are overlapped with the coverage area of itself, and sends the SGs interface paging message to the above-mentioned one or more MMEs.

In step 508, the MME2 without the user information returns the paging refusal after receiving the paging request.

In step 509, the MME1 with the user information pages the terminal after receiving the paging request.

In step 510, after the paging is finished, the MME1 judges that the MSC/VLR does not need the TMSI, so it returns the service request to the MSC/VLR.

The MSC/VLR receives the service request, confirms that the UE is under the MME1 and waits for the UE to fall back to the traditional circuit domain.

In step 511, the UE falls back to the circuit domain, and initiates a paging response from the traditional circuit domain switching network.

In step 512, if required, the MSC/VLR performs the access operation.

In step 513, the MSC/VLR sends the call setup request Setup to the UE.

In step 514, the MSC/VLR and the UE finish the left called setup process.

Figure 7:
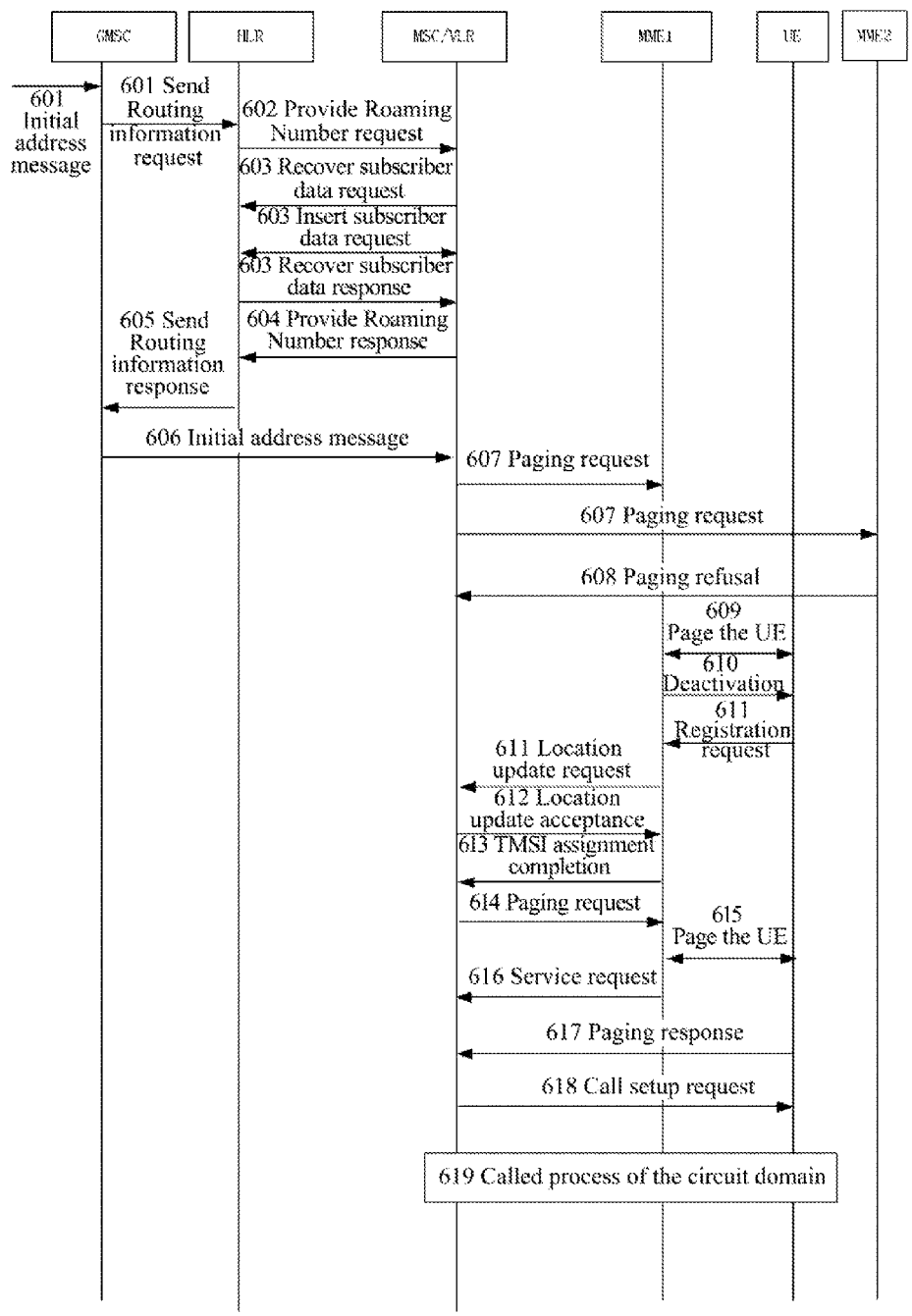
FIG. 7 is a flow chart of a paging method in embodiment two of the present document.

FIG. 7 is a flow chart of the paging method of embodiment two of the present document. In the present embodiment, after the MSC/VLR loses the subscriber data, it sends the paging message to a series of MMEs; wherein, one MME returns the SGs interface location update request; the MSC/VLR confirms that the UE is under the MME, and switches on the processing process of the call, including the following steps specifically.

In step 601, after receiving the Initial Address Message (IAM) of the outer net, the GMSC finds the called HLR according to the called Mobile Station Integrated Services Digital Network (MSISDN) number (that is, the user telephone number), and sends Send Routing Information (SRI) request to the HLR, with the MSISDN number of the user being carried therein.

In step 602, the HLR finds the MSC/VLR registered by the user according to the MSISDN number, and sends the Provide Roaming Number (PRN) request to the MSC/VLR.

In step 603, there are no subscriber data at present in the MSC/VLR, so the subscriber data are recovered from the HLR; in the process, the HLR fails to return the MME identification to the MSC/VLR.

In step 604, after the subscriber data are recovered, the MSC/VLR returns the roaming number to the HLR.

In step 605, the HLR returns the SRI response to the GMSC, which carries the MSRN.

In step 606, then the GMSC will route the call to the MSC/VLR according to the MSRN.

In step 607, the MSC/VLR judges that the subscriber data are lost previously, so the user wireless status information is not reliable, and then it analyzes the user identification, and finds that the user may reside in the LTE network, so the MSC/VLR finds out one or more MMEs which are overlapped with the coverage area of itself, and sends the SGs interface paging message to the above-mentioned one or more MMEs.

In step 608, the MME2 without the user information returns the paging refusal after receiving the paging request.

In step 609, the MME1 with the user information pages the terminal after receiving the paging request.

In step 610, after the paging is finished, the MME1 judges that the MSC/VLR needs the TMSI, and it sends a deactivation message to the UE, to require the UE to register again.

In step 611, the UE initiates the registration, and the MME1 sends the SGs interface location update request to the MSC/VLR.

In step 612, the MSC/VLR receives the SGs interface location update request, confirms that the UE is under the MME1, processes the location update process, and returns the SGs interface location update acceptance, which carries the TMSI.

In step 613, after the TMSI is accepted, the MME1 returns the TMSI assignment completion message to the MSC/VLR.

In step 614, the MSC/VLR pages again, sends the paging message to the above-mentioned MME1, and waits for UE to fall back to the traditional circuit domain.

In step 615, the MME1 sends the paging message to the UE, and the UE begins to fall back.

In step 616, the MME1 sends the service request to the MSC/VLR.

In step 617, the UE returns to the circuit domain, and initiates the paging response from the traditional circuit domain switching network.

In step 618, the MSC/VLR sends the call setup request Setup to the UE.

In step 619, the MSC/VLR and the UE finish the left called setup process.

Figure 8:
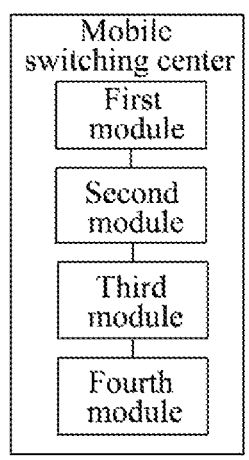
FIG. 8 is a diagram of a mobile switching center in an embodiment of the present document.

FIG. 8 is a diagram of a mobile switching center of the embodiment of the present document, as shown in FIG. 8, including:

a first module, configured to: when needing to page a user equipment according to service requirements, analyze a user identification if finding that subscriber data are lost at present, and judge whether the user equipment has a possibility of residing in a long term evolution network;

a second module, configured to: find out one or more mobility management entities which are overlapped with a coverage area of the mobile switching center itself when the first module judges that the user equipment has the possibility of residing in the long term evolution network;

a third module, configured to: send an SGs interface paging message to the mobility management entities found by the second module; and a fourth module, configured to: if receiving a location update request or a service request, then perform a paging processing with the mobility management entities sending the location update request or the service request.

Wherein, the fourth module is configured to perform a paging processing with the mobility management entities sending the location update request by means of: if receiving the location update request, then notifying the third module after processing the location update request; and the third module is further configured to: send again the paging message for the terminal to the mobility management entity sending the location update request after receiving a notification from the fourth module.

Figure 9:
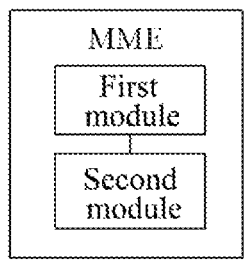
FIG. 9 is a diagram of an MME in an embodiment of the present document.

FIG. 9 is a diagram of the MME of the embodiment of the present document. As shown in FIG. 9, the MME of the present embodiment includes:

a first module, configured to receive a paging message for a terminal; and a second module, configured to perform a paging processing according to whether there are subscriber data corresponding to the terminal locally.

Wherein, the second module comprises:

a first unit, configured to judge whether there are the subscriber data corresponding to the terminal locally;

a second unit, configured to: when the first unit judges that there are no subscriber data corresponding to the terminal locally, return a paging refusal message to a mobile switching center; and a third unit, configured to: when the first unit judges that there are the subscriber data corresponding to the terminal locally, page the terminal.

Wherein, the second module further comprises:

a fourth unit, configured to: judge whether the mobile switching center needs a Temporary Mobile Subscriber Identity, if yes, return an interface location update request to the mobile switching center; if the mobile switching center does not need a Temporary Mobile Subscriber Identity, return a service request to the mobile switching center.

In the embodiment of the present document, after the HLR is reset, the VLR transfers the dual-mode single-frequency UE identification corresponding to the reset HLR to the MME, which enables the MME to register with the HLR again in time after the actions of these UEs, thus enabling the services of the users to be recovered as soon as possible and improving the service quality of the network.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

The above description is only for the preferred embodiments of the present document, and obviously, the technical scheme of the present document can have a variety of other embodiments. Those skilled in the art can make the corresponding modifications and variations according to the present document without departing from the spirit and essence of the present document. And all of these modifications or the variations should be embodied in the scope of the appended claims of the present document.

INDUSTRIAL APPLICABILITY

The embodiment of the present document provides a paging method and apparatus, to page the terminal in LTE under the condition that the VLR loses the subscriber data and the HLR fails to return the MME identification.

What we claim is:

1. A paging method, comprising:

when a mobile switching center needs to page a user equipment according to service requirements and when the mobile switching center has lost subscriber data of the user equipment at present, the mobile switching center analyzing a user identification of the user equipment to determine whether the user equipment has a possibility of residing in a long term evolution network, when the mobile switching center determines that the user equipment has the possibility of residing in the long term evolution network according to the analysis of the user identification of the user equipment, finding out a plurality of mobility management entities which are overlapped with a coverage area of the mobile switching center itself, and sending a paging message for the user equipment to said plurality of mobility management entities found out;

after receiving the paging message, a mobility management entity that has said subscriber data paging the user equipment and returning a location update request or a service request to the mobile switching center; and when receiving the location update request or the service request from the mobility management entity, the mobile switching center determining that the user equipment is under the mobility management entity that sends the location update request or the service request, and then performing subsequent service processing for the user equipment;

further comprising: after receiving the location update request from the mobility management entity, the mobile switching center performing a paging processing with the mobility management entity sending the location update request, wherein, after receiving the location update request, the mobile switching center sends again the paging message for the user equipment to the mobility management entity sending the location update request after processing the location update request.

2. The method according to claim 1, further comprising:
the mobility management entities receiving the paging message for the user equipment; and
performing respective processing according to whether there are said subscriber data of the user equipment locally.

3. The method according to claim 2, wherein, the step of performing respective processing according to whether there are said subscriber data of the user equipment locally comprises:
the mobility management entities judging whether there are said subscriber data of the user equipment locally, if there are not said subscriber data of the user equipment locally, returning a paging refusal message to the mobile switching center; if there are said subscriber data of the user equipment locally, paging the user equipment.

4. The method according to claim 3, after the step of the mobility management entity that has said subscriber data paging the user equipment, further comprising:
the mobility management entity that has said subscriber data judging whether the mobile switching center needs a Temporary Mobile Subscriber Identity, if the mobile switching center needsa Temporary Mobile Subscriber Identity, returning the location update request to the mobile switching center; if the mobile switching center does not need a Temporary Mobile Subscriber Identity, returning the service request to the mobile switching center.

5. A paging system, comprising a mobile switching center and mobility management entities, wherein the mobile switching center comprises:
a processor; and
a storage device for storing processor-executable instructions that when executed by the processor cause the processor to performs steps in following modules:
a first module, configured to: when needing to page a user equipment according to service requirements and when subscriber data of the user equipment has been lost at present, analyze a user identification of the user equipment to determine whether the user equipment has a possibility of residing in a long term evolution network;
a second module, configured to: find out a plurality of mobility management entities which are overlapped with a coverage area of the mobile switching center per se when the first module determines that the user equipment has the possibility of residing in the long term evolution network according to the analysis of the user identification of the user equipment;
a third module, configured to: send a paging message for the user equipment to said plurality of mobility management entities found out by the second module;

wherein after receiving the paging message, the mobility management entity that has said subscriber data pages the user equipment and returns a location update request or a service request to the mobile switching center; and a fourth module, configured to: when receiving the location update request or the service request from the mobility management entity, determine that the user equipment is under the mobility management entity that sends the location update request or the service request, and then perform subsequent service processing for the user equipment;

wherein in the mobile switching center,
the fourth module is further configured to perform a paging processing with the mobility update request from the mobility management entity, notifying the third module after processing the location update request; and the third module is further configured to send again the paging message for the user equipment to the mobility management entity sending the location update request after receiving a notification from the fourth module.

6. The system according to claim 5, wherein the mobility management entity comprises:
a processor; and
a storage device for storing processor-executable instructions that when executed by the processor cause the processor to perform steps in following modules:
a first module, configured to receive the paging message for the user equipment; and
a second module, configured to perform respective processing according to whether there are said subscriber data of the user equipment locally.

7. The system according to claim 6, wherein, the second module in the mobility management entity comprises:
a first unit, configured to judge whether there are said subscriber data of the user equipment locally;
a second unit, configured to: when the first unit judges that there are no said subscriber data of the user equipment locally, return a paging refusal message to the mobile switching center; and
a third unit, configured to: when the first unit judges that there are said subscriber data of the user equipment locally, page the user equipment.

8. The system according to claim 7, wherein, the second module in the mobility management entity further comprises:
a fourth unit, configured to: judge whether the mobile switching center needs a Temporary Mobile Subscriber Identity, if the mobile switching center needs a Temporary Mobile Subscriber Identity, return the location update request to the mobile switching center; if the mobile switching center does not need a Temporary Mobile Subscriber Identity, return the service request to the mobile switching center.

* * * * *